United States Patent
Beard et al.

(10) Patent No.: US 7,147,180 B1
(45) Date of Patent: Dec. 12, 2006

(54) TAPE REEL WITH SELF-GENERATING NEGATIVE PRESSURE

(75) Inventors: Robert A. Beard, Lafayette, CO (US); Hartvig E. Melbye, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 434 days.

(21) Appl. No.: 10/835,860

(22) Filed: Apr. 30, 2004

(51) Int. Cl.
*B65H 75/18* (2006.01)

(52) U.S. Cl. ............. 242/614; 242/548.4; 242/908

(58) Field of Classification Search ............ 242/345, 242/348, 611, 611.1, 614, 908, 548.4
See application file for complete search history.

(56) References Cited

U.S. PATENT DOCUMENTS

| | | | |
|---|---|---|---|
| 4,789,110 A * | 12/1988 | Sakaguchi et al. | 242/548.4 |
| 4,932,604 A | 6/1990 | Maehara et al. | |
| 5,054,709 A * | 10/1991 | Sato | 242/614 |
| 5,699,973 A | 12/1997 | Nakane et al. | 242/345 |
| 5,829,712 A | 11/1998 | Morita | 242/610.6 |
| 6,719,238 B1 * | 4/2004 | Grant et al. | 242/548.4 |

FOREIGN PATENT DOCUMENTS

JP 7021731 A2 1/1995

* cited by examiner

*Primary Examiner*—William A. Rivera
(74) *Attorney, Agent, or Firm*—Brooks Kushman P.C.

(57) ABSTRACT

A tape winding method and apparatus for facilitating the escape of air from between layers of a tape during a tape winding operation. A tape winding apparatus has a tape reel onto which a tape is adapted to be wound during a tape winding operation. A plurality of generally radial slots are provided in at least one of first and second flanges of the tape reel to create a fan-like action that generates a negative air pressure in the vicinity of the tape as the tape is being wound onto the tape reel to facilitate the escape of air from between layers of the tape during the tape winding operation.

18 Claims, 2 Drawing Sheets

TAPE REEL WITH SELF-GENERATING NEGATIVE PRESSURE

BACKGROUND OF THE INVENTION

1. Field of the Invention

The present invention relates generally to the tape handling field, and, more particularly, to a tape winding method and apparatus for facilitating the escape of air from between layers of a tape during a tape winding operation.

2. Background of the Invention

Magnetic tape is used in many industries to store data, programs and other information. Usually, a magnetic tape is stored on a tape reel, which typically comprises a cylindrical-shaped hub having flanges attached to opposite ends of the hub. The tape is wound around the hub, and the flanges help protect the tape during storage and handling.

A tape drive mechanism is used to write information onto or access information from a magnetic tape. A typical tape drive mechanism includes first and second tape reels, and appropriate guiding structure for guiding the tape from the first reel to the second reel. In a read/write operation, the tape is unwound from the first tape reel, guided across one or more read/write heads by the guiding structure, and then wound onto the second tape reel.

As interface speeds increase in tape drive mechanisms, air entrapment between tape layers as a tape is being wound onto a tape reel is becoming a significant issue. In particular, as tape is wound around the hub of a tape reel, air is dragged along with the tape and becomes entrapped between tape layers as the layers form around the hub. At low tape speeds, any entrapped air quickly escapes and causes few problems. At high tape speeds, however, air can remain entrapped between tape layers for some period of time before it is able to escape; and the entrapped air forms an air film that can cause a temporary separation between tape layers as the tape is being wound around the hub.

The time required for entrapped air to escape from between tape layers as a tape is being wound onto a tape reel depends on the winding speed and the surface texture of the tape. At high tape speeds, air can remain entrapped for several revolutions of the tape reel before it is able to escape. For example, at a tape speed of 4.9 meters per second, at least about five revolutions of the tape reel can occur before entrapped air can fully escape. The temporary separation between tape layers caused by the entrapped air can result in poor winding quality such as stagger wrap and unsupported tape edges; which, in turn, can result in tape damage and tracking problems when the tape is later unwound from the reel.

SUMMARY OF THE INVENTION

The present invention provides a tape winding method and apparatus for facilitating the escape of air from between layers of a tape during a tape winding operation.

A tape winding apparatus according to the invention has a tape reel onto which a tape is adapted to be wound during a tape winding operation, and a negative air pressure generator that generates a negative air pressure in the vicinity of the tape as the tape is being wound onto the tape reel to facilitate the escape of air from between layers of the tape during the tape winding operation.

By providing a negative air pressure in the vicinity of the tape as it is being wound onto the tape reel, any air that becomes entrapped between layers of the tape during the tape winding operation will escape more rapidly, resulting in improved tape winding quality, even at high tape winding speeds.

The above as well as further objectives, features and advantages of the invention will become apparent in the following detailed description of a presently preferred embodiment of the invention.

DETAILED DESCRIPTION OF THE PREFERRED EMBODIMENT

With reference now to the Figures and, in particular, with reference to FIG. 1, a diagram schematically illustrates a tape drive mechanism to assist in explaining the present invention. The tape drive mechanism is generally designated by reference number 100, and has a supply reel 102 for supplying magnetic tape 106 to a drive reel 104. Tape 106 travels along a tape path that extends from point A to point B between reels 102 and 104.

Tape drive mechanism 100 also includes a pair of read/write heads 108 and 110 for reading data from and writing data to tape 106 as the tape passes read/write heads 108 and 110. Alternatively, tape drive mechanism 100 may include only a single read/write head, if desired.

Tape drive mechanism 100 further includes a plurality of stationary guide rollers 112, 114, 116 and 118 for guiding tape 106 along the tape path. Guide rollers 112, 114, 116 and 118 are preferably flanged and grooved, and also function to limit lateral tape motion, skew and cross-web tension. A guide 120 may also be provided for extending the total length of the tape path.

Tape drive mechanism 100, including tape reels 102 and 104 may be enclosed within a housing, not shown in FIG. 1. Alternatively, tape reels 102 and 104 may be enclosed in separate housings, or need not be enclosed in any housing; and the invention is not limited to a tape drive mechanism of any particular construction.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a schematic, perspective view of a tape winding apparatus according to a presently preferred embodiment of the invention. The tape winding apparatus is generally designated by reference number 130; and, as shown in FIG.

Figure 1:
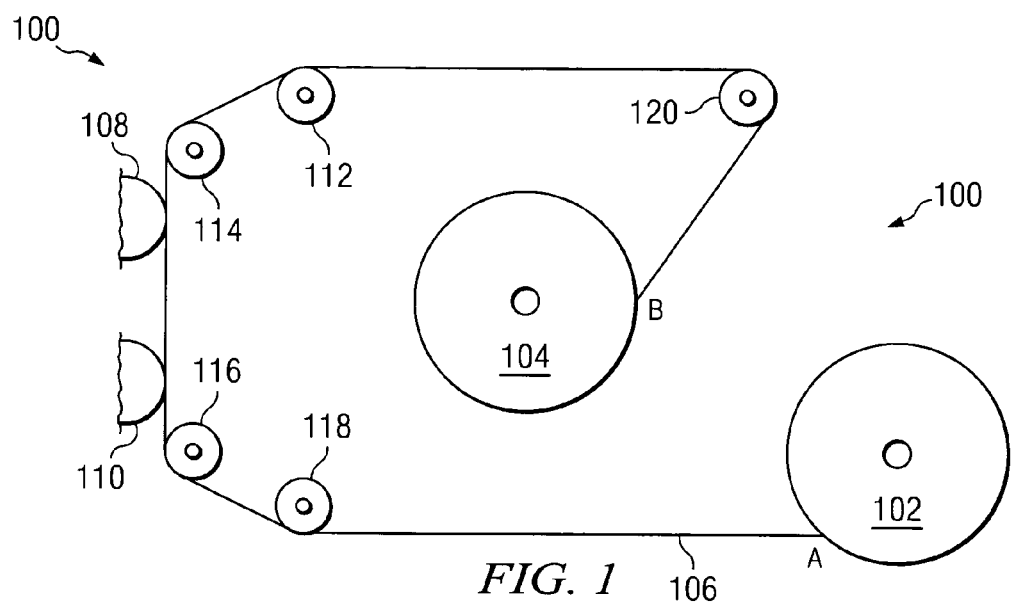
FIG. 1 schematically illustrates a tape drive mechanism to assist in explaining the present invention.

2 comprises a tape reel. Tape reel 130 may, for example, be implemented as drive reel 104 of tape drive mechanism 100 illustrated in FIG. 1.

Tape reel 130 includes a cylindrical drive hub 134 and first and second flanges 136 and 138 connected to opposite ends of drive hub 134. Flanges 136 and 138 comprise thin, circular-shaped disks, and are substantially parallel to one another, and substantially perpendicular to the axis of cylindrical drive hub 134. A tape 140 is adapted to be wound around drive hub 134 in a tape winding operation. Tape 140 may be implemented as tape 106 in FIG. 1, and may be supplied to tape reel 130 from a supply reel, such as supply reel 102 in FIG. 1, or from another tape source.

Figure 2:
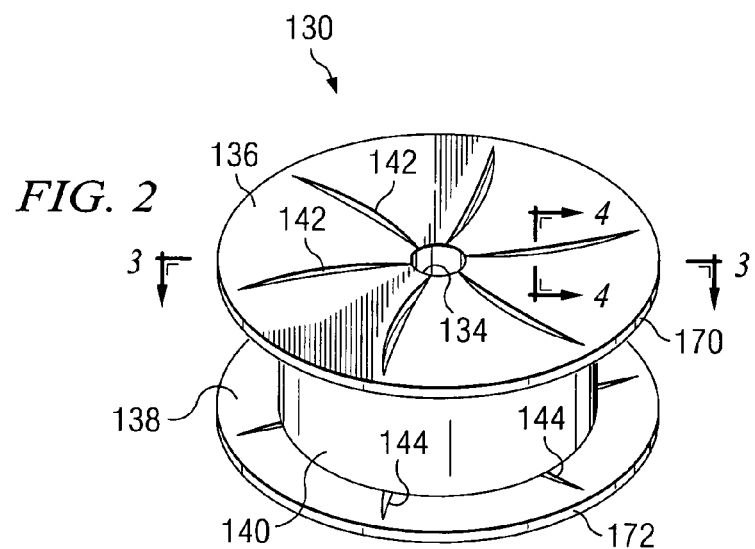
FIG. 2 is a schematic, perspective view of a tape winding apparatus according to a preferred embodiment of the invention.

As also illustrated in FIG. 2, first flange 136 includes a plurality of generally radial slots 142, and second flange 138 includes a plurality of generally radial slots 144. As will be described in greater detail hereinafter, slots 142 and 144 comprises a negative air pressure generator that functions to generate a negative air pressure between flanges 136 and 138 of tape reel 130 during a tape winding operation to facilitate the escape of air from between layers of tape 140 as tape 140 is wound around drive hub 134.

Figure 3:
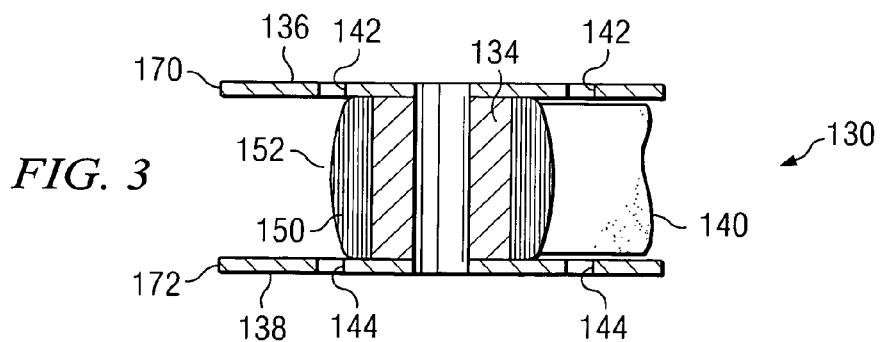
FIG. 3 is a cross-sectional view of the tape winding apparatus of FIG. 2 taken along line 3—3 in FIG. 2.

FIG. 3 is a schematic, cross-sectional view of tape reel 130 taken along line 3—3 in FIG. 2. FIG. 3 illustrates a tape pack 150 being formed around drive hub 134 during a tape winding operation. As tape 140 is wound onto tape reel 130, air is dragged along with the tape; and becomes entrapped between tape layers as the layers form around the drive hub. At relatively low tape winding speeds, the air quickly escapes and causes little problem. At relatively high tape winding speeds, however, the air tends to remain entrapped between tape layers creating an air film, schematically illustrated at 152 in FIG. 3, that causes a temporary separation between adjacent tape layers. Depending on the tape speed and the surface texture of the tape, the entrapped air film between adjacent layers can last for some period of time before the air is able to fully escape. For example, at a tape speed of 4.9 meters/second, it may require five or more revolutions of the tape reel before entrapped air is able to escape. Retention of an air film for such a length of time can result in poor winding quality such as stagger wrap and unsupported tape edges, and can result in tape damage and tracking problems when the tape is later unwound from the tape reel.

In accordance with a preferred embodiment of the present invention, the escape of air from between tape layers as tape 140 is wound onto tape reel 130 during a tape winding operation is facilitated by providing slots 142 and 144 in first and second flanges 136 and 138, respectively, of tape reel 130. Slots 142 and 144 comprises a negative air pressure generator for generating a negative air pressure between flanges 136 and 138 during a tape winding operation. In particular, as tape reel 130 rotates during a tape winding operation, slots 142 and 144 create a fan-like action that causes air to flow outwardly through the slots and to be withdrawn from between flanges 136 and 138 thus generating a negative air pressure between flanges 136 and 138 and around tape pack 150 as tape pack 150 is being formed. As a result of the negative air pressure, any air that has been trapped between tape layers during winding of the tape will escape more rapidly, thus preventing an air film, such as air film 152 in FIG. 3, from remaining between tape layers for a length of time sufficient to significantly affect winding quality of the tape.

Figure 4:
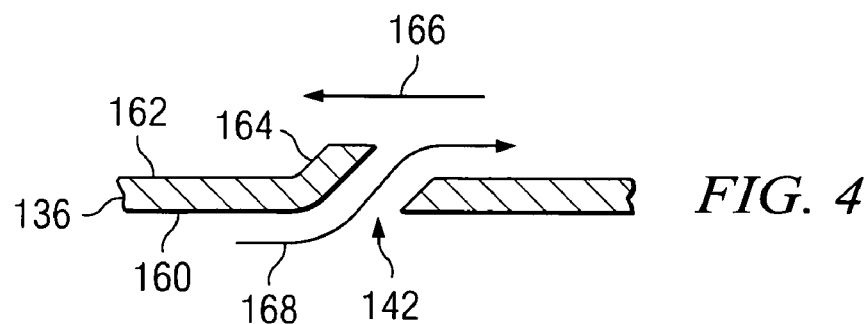
FIG. 4 is a cross-sectional view of a portion of the tape winding apparatus of FIG. 2 taken along line 4—4 in FIG. 2.

FIG. 4 is a schematic cross-sectional view, taken along line 4—4 in FIG. 2, of a slot 142 in first flange 136. Inasmuch as each of the plurality of slots 142 is identical, only one slot is described in detail herein.

As shown in FIG. 4, slot 142 extends through first flange 136 from inner surface 160 to outer surface 162 thereof. The slot has a slanted cross-section, and includes a ridge 164 that extends upwardly from outer surface 162 and along an edge of the slot that faces the direction of rotation 166 of tape reel 130.

As tape reel 130 rotates in the direction illustrated by arrow 166 in FIG. 4, the slanted cross-section of the slots, in conjunction with the raised ridges extending along the edges of the slots, create a fan-like action that withdraws air from between flanges 136 and 138 of tape reel 130 to generate and maintain a negative air pressure between first and second flanges 136 and 138 and around tape pack 150 (see FIG. 3). The negative air pressure causes any air that has become entrapped between tape layers during a tape winding operation to rapidly escape through the slots as shown by arrow 168 in FIG. 4, thus preventing an air film from remaining between tape layers for any significant length of time.

Each flange 136 and 138 preferably contains from about six to about eight slots, although the invention is not limited to any particular number of slots. The slots are arranged generally radially on the flanges, as shown in FIG. 2, and extend from adjacent drive hub 134 to adjacent outer edges 170 and 172 of flanges 136 and 138, respectively. Slots 142 and 144 may be straight or curved. Curved slots, such as illustrated in FIG. 2, provide the advantage of compensating for differences in the rotational speed of the flanges at different radial distances from hub 134 so as to maintain a uniform negative pressure between the flanges throughout the tape reel.

Slots 142 and 144 preferably have a width of about 1 mm to about 3 mm, and are slanted at an angle of about 1° to about 12°, although the invention is not restricted to any particular slot width or slant angle. In general, the greater the slot angle from inner surface 160 to outer surface 162 of flange 136, the greater the negative air pressure generated around the tape pack during rotation of the tape reel. The invention is also not restricted to any particular height for ridges 164. In general, the higher the ridges, the greater the negative air pressure generated around the tape pack during rotation of the tape reel.

Figure 5:
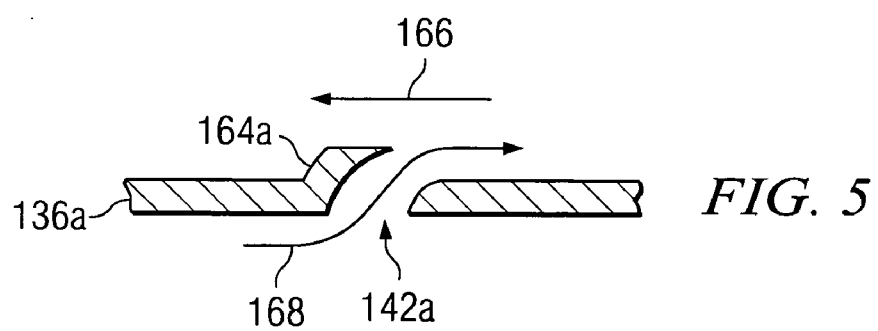
FIG. 5 is a cross-sectional view of a portion of a tape winding apparatus according to an alternative embodiment of the invention.

Slots 142 and 144 in first and second flanges 136 and 138, respectively, can have a straight cross-section, as illustrated in FIG. 4, or they may have a contoured cross-section, as shown in FIG. 5. In particular, as shown in FIG. 5, slot 142a and ridge 164a on flange 136a are both contoured to provide an enhanced aerodynamic design.

As shown in FIG. 2, first flange 136 and second flange 138 are each provided with a plurality of slots so as to provide a balanced pressure around tape pack 150 during a tape winding operation. Achievement of a balanced pressure may necessitate some asymmetry in the design of slots in the first and second flanges. For example, if tape reel 130 is incorporated in a cartridge, the shape of the cartridge housing adjacent one flange may be somewhat different from the shape of the cartridge housing adjacent the other flange. This non-uniformity can result in spacing differences between the flanges and the housing necessitating a slightly different design for the slots in the flanges. Any non-uniformity can be accommodated by varying the slant angle of the slots in one flange with respect to the slant angle of the slots in the other flange and/or by varying the height of the ridges on one flange with respect to the height of the ridges on the other flange.

As described above, during a winding operation according to the present invention, the plurality of slots in the first and second flanges will generate and maintain a negative air pressure in the vicinity of a tape pack being formed around the drive hub of the tape reel to facilitate the escape of air that becomes entrapped between tape layers. As also described previously, the likelihood of air remaining entrapped between tape layers for a significant length of time increases as the rotational speed of the tape reel increases. With the present invention, however, the greater the rotational speed of the tape reel, the greater the amount of air movement that will be created by the slots, resulting in a more negative air pressure around the tape pack to enhance removal of entrapped air. Thus, the tape winding apparatus of the present invention is self-adjusting as a function of the rotational speed of the tape reel so as to ensure proper winding of the tape at all tape winding speeds.

Figure 6:
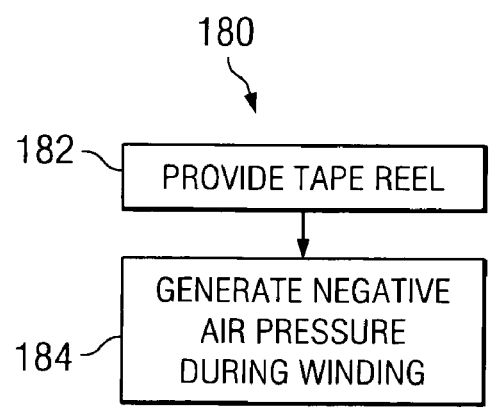
FIG. 6 is a flowchart that illustrates a method for winding a tape onto a tape reel according to a further alternative embodiment of the invention.

FIG. 6 is a flowchart that illustrates a method for winding a tape on a tape reel according to further exemplary embodiment of the invention. The method is generally designated by reference number 180, and begins by providing a tape reel onto which a tape is adapted to be wound during a tape winding operation (step 182). Thereafter, during a winding operation, a negative air pressure is generated in the vicinity of the tape as the tape is being wound onto the tape reel to facilitate removal of air from between layers of the tape during a tape winding operation (step 184).

The present invention thus provides a tape winding method and apparatus that facilitates the escape of air from between tape layers as a tape is being wound onto a tape reel during a tape winding operation. The tape winding apparatus includes a negative air pressure generator that generates a negative air pressure in the vicinity of the tape as the tape is being wound onto the tape reel. As a result of the negative air pressure, any air that has been trapped between tape layers during winding of the tape will escape more rapidly, thus preventing an air film from remaining between tape layers for any significant length of time, and resulting in improved tape winding quality, even at high tape winding speeds.

The description of the present invention has been presented for purposes of illustration and description, and is not intended to be exhaustive or limited to the invention in the form disclosed. Many modifications and variations will be apparent to those of ordinary skill in the art. For example, although the invention has been described in connection with winding a magnetic tape in a read/write operation, the invention can be used to wind magnetic tape or other types of tape in numerous different applications.

In general, the embodiment herein was chosen and described in order to best explain the principles of the invention, the practical application, and to enable others of ordinary skill in the art to understand the invention for various embodiments with various modifications as are suited to the particular use contemplated.

What is claimed is:

1. A tape winding apparatus comprising:
a tape reel onto which a tape is adapted to be wound during a tape winding operation, the tape reel further comprising a hub around which the tape is wound during the tape winding operation, and first and second flanges attached to opposite ends of the hub for guiding the tape onto the hub; and
a negative air pressure generator for generating a negative air pressure in the vicinity of the tape as the tape is being wound onto the tape reel to facilitate the escape of air from between layers of the tape during the tape winding operation, wherein the negative air pressure generator comprises a plurality of generally radial slots in at least one of the first and second flanges.

2. The apparatus according to claim 1, wherein each of the plurality of slots extends through the at least one flange from an inner surface to an outer surface thereof, and wherein each of the plurality of slots has a slanted cross-section.

3. The apparatus according to claim 2, wherein each of the plurality of slots further includes a ridge extending from the outer surface of the at least one flange and along an edge of the slot facing a direction of rotation of the tape reel, the slanted cross-section of each of the plurality of slots in conjunction with the ridge extending along an edge of each of the plurality of slots creating a fan-like action for withdrawing air from between the first and second flanges for generating the negative air pressure in the vicinity of the tape as the tape is being wound onto the tape reel during a tape winding operation.

4. The apparatus according to claim 1, wherein each of the plurality of slots comprises a curved slot.

5. The apparatus according to claim 1, wherein each of the plurality of slots has a straight slanted cross-section.

6. The apparatus according to claim 1, wherein each of the plurality of slots has a contoured slanted cross-section.

7. The apparatus according to claim 1, wherein the first and second flanges each include a plurality of generally radial slots.

8. The apparatus according to claim 7, wherein the plurality of slots in the first flange and the plurality of slots in the second flange maintain a balanced negative air pressure around the tape being wound onto the tape reel.

9. The apparatus according to claim 7, wherein the plurality of slots in each of the first and second flanges comprises from about six to about eight slots.

10. A tape winding apparatus comprising:
a tape reel onto which a tape is adapted to be wound during at ape winding operation, the tape reel including a hub around which the tape is wound during the tape winding operation, and first and second flanges attached to opposite ends of the hub for guiding the tape onto the hub; and
a plurality of generally radial slots in each of the first and second flanges and extending through the first and second flanges from an inner surface to an outer surface thereof for generating a negative air pressure in the vicinity of a tape pack being formed around the hub as the tape is wound around the hub for facilitating the removal of air from between layers of the tape during the tape winding operation.

11. The apparatus according to claim 10, wherein each of the plurality of slots has a slanted cross-section and a ridge extending from an outer surface of the first and second flanges and along an edge of the slot facing the direction of rotation of the tape reel, the slanted cross-section of each of the plurality of slots, in conjunction with the ridge extending along an edge of each of the plurality of slots creating a fan-like action for withdrawing air from between the first and second flanges for generating the negative air pressure around the tape pack being formed around the hub during a tape winding operation.

12. The apparatus according to claim 11, wherein each of the plurality of slots comprises a curved slot.

13. The apparatus according to claim 11, wherein each of the plurality of slots has a straight slanted cross-section.

14. The apparatus according to claim 11, wherein each of the plurality of slots has a contoured slanted cross-section.

15. The apparatus according to claim 10, wherein the tape comprises a magnetic tape.

16. A method for winding a tape onto a tape reel, comprising:

providing a tape reel onto which a tape is adapted to be wound during a tape winding operation, wherein the tape reel includes first and second flanges for guiding the tape onto the tape reel; and generating a negative air pressure in the vicinity of the tape as the tape is being wound onto the tape reel for facilitating the escape of air from between layers of the tape during the tape winding operation, and wherein generating a negative air pressure comprises providing a plurality of generally radial slots on at least one of the first and second flanges to create a fan-like action to withdraw air from the vicinity of the tape as the tape is being wound onto the tape reel during the tape winding operation.

17. The method according to claim 16, wherein generating a negative air pressure comprises providing a plurality of generally radial slots on each of the first and second flanges.

18. The method according to claim 17, wherein each of the plurality of slots in each of the first and second flanges has a slanted cross-section and a ridge extending from an outer surface of the flange and along an edge of the slot facing a direction of rotation of the tape reel, and wherein the method further includes adjusting at least one of a slang angle and a height of the ridges of the plurality of slots in one of the first and second flanges with respect to the plurality of slots in the other of the first and second flanges to achieve a balanced pressure around the tape being wound onto the tape reel.

* * * * *